United States Patent
Knechtges

(10) Patent No.: US 8,448,756 B2
(45) Date of Patent: May 28, 2013

(54) PROCEDURE FOR ACTUATING A HYDRAULIC PARKING BRAKE

(75) Inventor: Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 127 days.

(21) Appl. No.: 12/920,681

(22) PCT Filed: Dec. 11, 2008

(86) PCT No.: PCT/EP2008/010541
§ 371 (c)(1),
(2), (4) Date: Nov. 11, 2010

(87) PCT Pub. No.: WO2009/109210
PCT Pub. Date: Sep. 11, 2009

(65) Prior Publication Data
US 2011/0042171 A1 Feb. 24, 2011

(30) Foreign Application Priority Data
Mar. 3, 2008 (DE) .......................... 10 2008 012 338

(51) Int. Cl.
*F16D 65/14* (2006.01)
(52) U.S. Cl.
USPC ....................................... 188/72.8; 188/72.2
(58) Field of Classification Search
USPC . 188/17, 18 A, 18 R, 72.6–72.8, 72.4; 303/3, 303/15
See application file for complete search history.

(56) References Cited

U.S. PATENT DOCUMENTS

| 6,394,235 | B1 | 5/2002 | Poertzgen et al. | |
|---|---|---|---|---|
| 7,267,206 | B2 | 9/2007 | Dupuis | |
| 7,744,166 | B2 | 6/2010 | Leiter et al. | |
| 7,753,178 | B2 | 7/2010 | Ohtani et al. | |
| 2007/0158148 | A1* | 7/2007 | Ohtani et al. | 188/158 |
| 2010/0033009 | A1 | 2/2010 | Knechtges | |

FOREIGN PATENT DOCUMENTS

| CN | 1942353 A | 4/2007 |
|---|---|---|
| CN | 101003273 A | 7/2007 |
| DE | 10150803 A1 | 5/2003 |
| DE | 102004004992 A1 | 9/2005 |
| DE | 102004062810 A1 | 9/2005 |
| DE | 102005042282 A1 | 3/2007 |

(Continued)

OTHER PUBLICATIONS

Text of the Chinese First Office Action, First Notification of Office Action and Search Report Application No. 200880128951X dated Nov. 5, 2012.

*Primary Examiner* — Anna Momper
(74) *Attorney, Agent, or Firm* — MacMillan, Sobanski & Todd, LLC

(57) ABSTRACT

A procedure for actuating a parking brake is described, the parking brake comprising a brake piston which is received in a hydraulic chamber and is displaceable within the hydraulic chamber by means of a hydraulic actuator on the one hand and a mechanical actuator on the other. During operation of the parking brake the mechanical actuator is activated in a first step in order to displace the brake piston in the hydraulic chamber in such a way that a volume of a hydraulic fluid contained in the hydraulic chamber is increased. At a subsequent time the hydraulic actuator is activated in order to build up or increase a clamping force of the parking brake. The hydraulically generated or increased clamping force is then maintained by means of the mechanical actuator.

15 Claims, 8 Drawing Sheets

FOREIGN PATENT DOCUMENTS

| | | | |
|---|---|---|---|
| DE | 102005046991 A1 | 4/2007 |
| DE | 102006033333 A1 | 8/2007 |
| EP | 0996560 A2 | 5/2000 |
| EP | 1614600 A1 | 1/2006 |
| FR | 2875878 A1 | 3/2006 |

\* cited by examiner

PROCEDURE FOR ACTUATING A HYDRAULIC PARKING BRAKE

CROSS-REFERENCE TO RELATED APPLICATIONS

This application is a national stage of International Application No. PCT/EP2008/010541 filed Dec. 11, 2008, the disclosures of which are incorporated herein by reference in entirety, and which claimed priority to German Patent Application No. 10 2008 012 338.2 filed Mar. 3, 2008, the disclosures of which are incorporated herein by reference in entirety.

BACKGROUND OF THE INVENTION

The invention relates generally to the field of parking brakes. In particular, the invention concerns parking brakes in which electric-motor driven hydraulic pumps are provided to build up a hydraulic pressure.

Known from EP 0 996 560 A1, and corresponding U.S. Pat. No. 6,394,235 B1, both of which are incorporated by reference herein in entirety, is a hydraulic vehicle brake which can be operated both as a service brake and as a parking brake. When braking using the service brake, hydraulic fluid is introduced under pressure in a conventional manner into a hydraulic chamber delimited by a movable brake piston. The build-up of pressure in the hydraulic chamber leads to displacement of the brake piston, and of a friction lining cooperating with the brake piston, in the direction of a brake disc, which is braked by the friction lining pressed against it. A vehicle wheel coupled non-rotatably to the brake disc is then also braked together with the brake disc.

In order that the vehicle brake can be used not only as a service brake but additionally as a parking brake, it has an electric-motor driven nut/spindle arrangement. The nut/spindle arrangement allows mechanical actuation of the brake piston as well as locking of the brake piston in a state in which the friction lining is pressed against the brake disc.

In order to park a vehicle on an inclined road surface with the aid of the parking brake, high clamping forces are necessary. So that high clamping forces can be generated by means of the nut/spindle arrangement, the electric motor drive for the nut/spindle arrangement must be dimensioned to deliver appropriate power.

To provide relatively low-power drives for the nut/spindle arrangement in order to save weight and installation space, it is proposed in DE 10 2005 046 991 A1, and corresponding U.S. Publication No. 2010/0033009 A1, both of which are incorporated by reference herein in entirety, to clamp the parking brake by means of a hydraulically generated clamping force. The hydraulic clamping force in parking brake mode is usually generated independently of a brake pedal actuation by the driver. More precisely, an electric-motor driven hydraulic pump associated, for example, with a driving stability system (also referred to as an electronic stability control or ESC system), is used to build up the hydraulic pressure in parking brake mode. The parking brake which has been hydraulically clamped by means of the pump must then only be locked by bringing an actuating member driven by the nut/spindle arrangement into abutment against the brake piston which has been displaced by means of hydraulic pressure.

The background noise accompanying the pump operation for hydraulically clamping the parking brake is often felt to be intrusive. Although attempts have been made to mitigate the noise problem by decoupling the vibration from the vehicle, this measure has proved inadequate. It has therefore additionally been considered to carry out the hydraulic pressure build-up in parking brake mode at low engine speed. In that case, however, the pressure build-up requires more time, and during this (longer) time the pump operation noises are still clearly perceptible, even if somewhat reduced.

BRIEF SUMMARY OF THE INVENTION

It is a feature of the invention to specify a procedure for the noise-optimised operation of a hydraulic parking brake system.

According to one aspect, a method is provided for actuating a parking brake comprising a brake piston which is received in a hydraulic chamber and is displaceable within the hydraulic chamber by means of a hydraulic actuator on the one hand and a mechanical actuator on the other. The method comprises the steps of activating the mechanical actuator to displace the brake piston in the hydraulic chamber in such a manner that a volume of a hydraulic fluid contained in the hydraulic chamber is increased; activating the hydraulic actuator, once the hydraulic fluid volume in the hydraulic chamber has been increased by means of the mechanical actuator, in order to build up or increase a clamping force of the parking brake; and actuating the mechanical actuator to maintain the clamping force.

In the course of the displacement of the brake piston by means of the mechanical actuator, a negative pressure which draws hydraulic fluid into the hydraulic chamber may be generated in the hydraulic chamber. In this way the hydraulic fluid volume inside the hydraulic chamber can be increased even without actuating the hydraulic actuator. The approach of increasing the hydraulic fluid volume inside the hydraulic chamber by means of the mechanical actuator in an initial phase of a parking brake operation therefore enables the running time of the hydraulic actuator, and the accompanying background noise, to be reduced.

After its initial activation to increase the hydraulic fluid volume contained in the hydraulic chamber, the mechanical actuator may be switched off and only reactivated in order to maintain (and optionally to further increase) a clamping force built up or increased hydraulically. It is also possible to operate the mechanical actuator permanently, or over a relatively long period, simultaneously with the hydraulic actuator. Thus, the mechanical actuator could remain activated throughout the operating phase of the hydraulic actuator. In such a case, however, the build-up of clamping force is advantageously effected by hydraulic means, while mechanically driven means of the mechanical actuator essentially merely follow rapidly behind the hydraulically actuated brake piston. Simultaneous operation of the mechanical and hydraulic actuators can shorten the total duration of the parking brake operation, since the mechanical actuator can, in particular, take over its holding function more quickly.

If the mechanical actuator is deactivated in a time-related manner with respect to the activation of the hydraulic actuator, various scenarios for this deactivation are possible. For example, the mechanical actuator may remain activated substantially until friction linings have been brought into contact with a brake disc by the brake piston. In other words, the mechanical actuator may already generate a limited clamping force in the lower clamping force range. However, it is also possible to deactivate the mechanical actuator before the friction linings have come into contact with the brake disc. In this case the activation of the mechanical actuator in an initial phase of the parking brake operation is directed substantially at increasing the hydraulic fluid volume contained in the hydraulic chamber.

According to a development of the first aspect, the clamping force of the parking brake building up in the course of activation of the mechanical actuator is determined continuously. Depending on the clamping force determined, the hydraulic actuator is then activated. The continuous determination of the clamping force may include an estimation of the clamping force. The estimation of the clamping force is possible, for example, on the basis of a current consumption of an electric motor associated with the mechanical actuator, or on the basis of an estimated or measured advance of the brake piston.

The hydraulic actuator may then be activated when a volume of the hydraulic chamber has been increased through activation of the mechanical actuator until approximately 35% to 75% (for example, approximately 50% to 60%) of the maximum hydraulic fluid receiving capacity of the hydraulic chamber has been reached. It is also possible for the activation of the hydraulic actuator to take place when the clamping force generated by means of the mechanical actuator corresponds to a hydraulic fluid pressure which is predetermined, or is determined in a situation-dependent manner. The equivalent hydraulic fluid pressure is the pressure which would have to be generated hydraulically in the hydraulic chamber in order to achieve the same clamping force value. According to a variant, this equivalent hydraulic fluid pressure is approximately 10 to 50 bar (for example, approximately 35 to 45 bar).

According to a development, the method comprises a continuous determination of a clamping force of the parking brake which is building up in the course of activation of the hydraulic actuator. The hydraulic actuator can then be deactivated as a function of the clamping force determined. If the mechanical actuator has been at least briefly deactivated during the build-up or increase of the clamping force by means of the hydraulic actuator, renewed activation of the mechanical actuator may take place in temporal conjunction with the deactivation of the hydraulic actuator.

The continuous determination of the clamping force in conjunction with the deactivation of the hydraulic actuator, and/or with the renewed activation of the mechanical actuator, may be effected in various ways. For example, the determination of the clamping force is based on an estimation thereof on the basis, for example, of a current consumption of an electric motor associated with the hydraulic actuator, or on the basis of an estimated or measured hydraulic fluid pressure.

According to a further aspect, a computer program product with program code means for carrying out the method described herein is made available, if the computer program product runs on a computer-controlled processing unit. Such a processing unit may comprise an electronic control unit (ECU) on or in the motor vehicle. The processing unit may also control further functions of the motor vehicle (for example, brake functions such as those of an antilock system (ABS), an electronic stability control system (ESC) or hill start assistance).

The computer program product may be stored on a computer-readable data carrier. For example, the computer program product may be stored on a removable data carrier such as a diskette, a hard drive, a CD-ROM or a DVD, or on a fixed data carrier such as a semiconductor memory (for example, a RAM, ROM, EPROM, EEPROM, flash memory, etc.).

According to a third aspect, there is made available a parking brake comprising a brake piston which is received in a hydraulic chamber and is displaceable in the hydraulic chamber by means of a hydraulic actuator on the one hand and a mechanical actuator on the other. The parking brake includes a first control module which is configured to activate the mechanical actuator in order to displace the brake piston in the hydraulic chamber in such a manner that a volume of a hydraulic fluid contained in the hydraulic chamber is increased; a second control module which is configured to activate the hydraulic actuator, once the hydraulic fluid volume in the hydraulic chamber has been increased by means of the mechanical actuator, in order to build up or increase a clamping force of the parking brake; and a third control module which is configured to actuate the mechanical actuator in order to maintain the clamping force.

The hydraulic actuator may include at least one hydraulic pump which can be actuated by electric motor. In addition, the mechanical actuator may include a nut/spindle arrangement which can be actuated by electric motor.

The parking brake may be equipped with a device for continuously determining the clamping force, so that the actuators can be activated as a function of the clamping force determined. The device for continuously determining the clamping force may include a hydraulic pressure sensor. Alternatively or additionally, the device for continuously determining the clamping force may include a sensor for detecting a current consumption of at least one actuator component (for example, an electric motor).

Other advantages of this invention will become apparent to those skilled in the art from the following detailed description of the preferred embodiments, when read in light of the accompanying drawings.

DETAILED DESCRIPTION OF THE INVENTION

Figure 1:
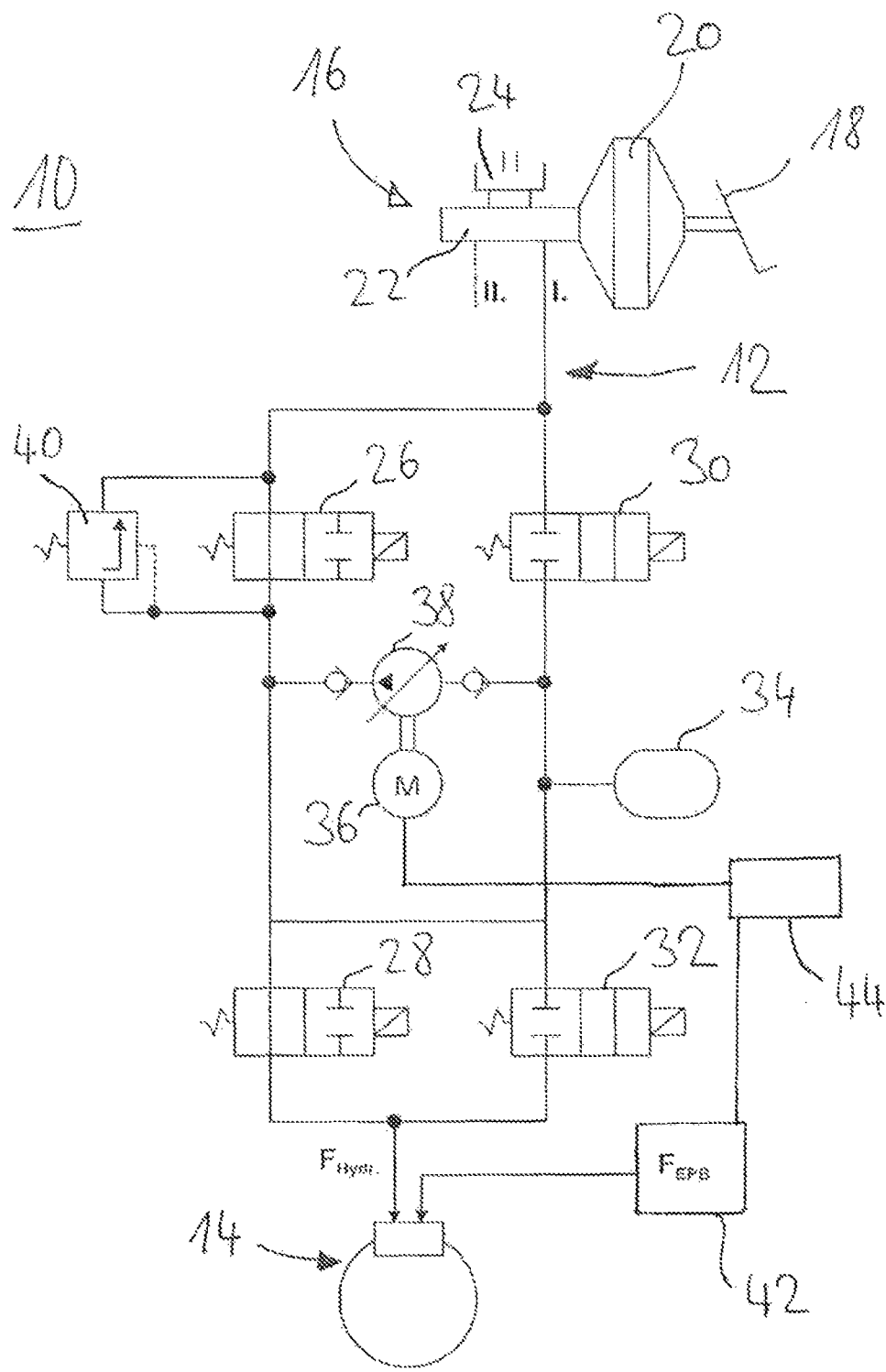
FIG. 1 shows a hydraulic parking brake system according to an embodiment.

FIG. 1 shows an embodiment of a motor vehicle brake system 10 with hydraulic parking brake functionality. The brake system 10 comprises two separate brake or hydraulic circuits with a brake circuit split of the X-split type, for example, in which each front wheel and the opposite-side rear wheel of the motor vehicle are allocated to exactly one of the two brake circuits respectively. For simplicity, only a single brake circuit 12 with only a single wheel brake 14 is shown in detail in FIG. 1.

For service brake operations there is provided a brake pressure generating unit 16 configured in a conventional manner. The brake pressure generating unit 16 comprises a brake pedal 18, a brake servo 20, a master cylinder 22 coupled to both brake circuits and an unpressurised reservoir 24 for hydraulic fluid. In deviation from the embodiment represented in FIG. 1, in which the wheel brake pressure for service brake operations is generated by foot pressure, the invention could also be implemented in a brake-by-wire system (also referred to as an electrohydraulic brake system, EHB).

In the single brake circuit 12 represented in FIG. 1 there are provided four valve arrangements 26, 28, 30, 32, a pressure relief component 40 associated in known fashion with the valve arrangement 26, a pressure accumulator 34 for hydraulic fluid, an ESC hydraulic unit with an electric motor 36 and a pressure generating unit in the form of a hydraulic pump 38 driven by the electric motor 36.

The hydraulic unit with the electric motor 36 and the hydraulic pump 38 forms a hydraulic actuator which, as will be explained below, comes into use even during parking brake operations. In addition, a mechanical actuator 42 and a control device, in the form of an electronic control unit (ECU) 44 coupled electrically to the mechanical actuator 42 and to the electric motor 36 of the hydraulic actuator, also come into use in parking brake mode. As indicated in FIG. 1, a hydraulic clamping force component $F_{Hydr}$ can be generated at the wheel brake 14 by means of the hydraulic actuator 36, 38, while a mechanical clamping force component $F_{EPB}$ can be generated by means of the mechanical actuator 42. The abbreviation EPB stands for "electric parking brake".

The mechanical actuator 42 indicated only schematically in FIG. 1 includes, in the embodiment, a mechanical component in the form of a nut/spindle arrangement and an electric motor drive provided therefor. These components will now be explained in more detail in conjunction with the wheel brake 14 represented, in a longitudinal section with respect to a longitudinal axis A, in FIG. 2.

The wheel brake 14 includes a housing 50 with a hydraulic chamber 52 in which a brake piston 54 is received displaceably, coaxially with the longitudinal axis A of the housing. A sealing arrangement 56 seals the brake piston with respect to the hydraulic chamber 52. The hydraulic chamber 52 is connected to a hydraulic line 58 which connects the wheel brake 14 to the valve arrangements 28, 32 represented in FIG. 1. Pressurised hydraulic fluid can be introduced into the hydraulic chamber 52 via the hydraulic line 58 in order to displace the brake piston 54.

Upon being displaced, the brake piston 54 acts directly on a first friction lining 60 and (according to the floating caliper principle) indirectly on a second friction lining 64 via a brake caliper 62 formed on the housing 50. Arranged between the first and second brake linings 60, 64 is a rotary member in the form of a brake disc 66 which is connected non-rotatably (in a manner not shown in detail) to a wheel of the vehicle. If a displacement of the brake piston 54 takes place towards the left in FIG. 2 as a result of a hydraulic pressure induced in the hydraulic chamber 13, the friction linings 60, 64 are clamped against the side faces of the brake disc 66 to generate a clamping force (also referred to as a braking force or brake application force). This hydraulic clamping can take place both in the course of a service brake operation and in the course of a parking brake operation.

Specifically for parking brake operations, the wheel brake 14 further has a mechanical actuator which comprises an electric motor 68 together with a drive unit in the form of a nut/spindle arrangement 70, 72. The electric motor 68 can be activated electrically by the control unit 44 by means of control signals. In this case the nut/spindle arrangement 70, 72 converts a rotary motion of the electric motor 68 into a longitudinal motion for an actuating member 74. The actuating member 74 is arranged displaceably, coaxially with the longitudinal axis A, inside the hydraulic chamber 52 and acts on a base 54' of the brake piston 54. With appropriate activation of the electric motor 68, a displacement of the actuating member 74 to the left in FIG. 2 in the direction towards the brake linings 60, 64, and in the inverse direction, can thereby be generated.

Figure 2:
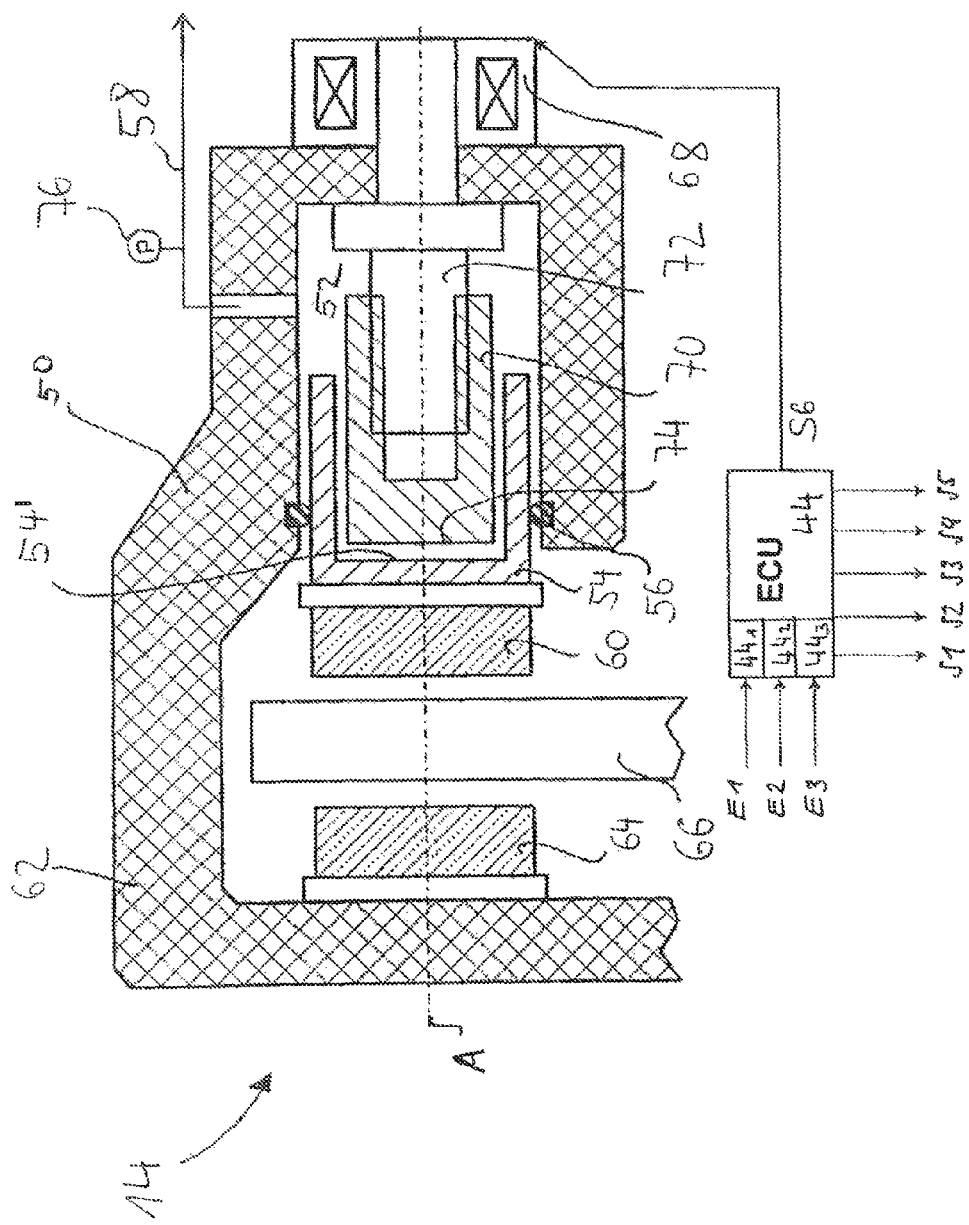
FIG. 2 shows a wheel brake of the hydraulic parking brake system according to FIG. 1.

The control unit 44 has a number of outputs S1 to S6 for supplying control signals to, inter alia, the components represented in FIGS. 1 and 2. As an example, in FIG. 2 the output S6 is connected to the electric motor 68. As shown in FIG. 1, a further output is connected to the electric motor 36.

In addition, information on operating states of the vehicle detected by suitable sensors (not represented in detail) is supplied for processing to the control unit ECU 44 via input signals E1. These operating states include the rotational speeds of the brake disc 66 or of the associated wheels of the vehicle, in order to detect, inter alia, standstill of the vehicle, the inclination of the road surface on which the vehicle is to be held stationary in parking brake mode, and the load state of the vehicle. Via input signals E2 it is communicated to the control unit 44, by a switching means (not represented in detail) operable by the driver, that a parking brake operation is desired in order to hold the vehicle stationary, for example. Furthermore, in the context of a "hill hold" or "auto hold" function, a parking brake operation which is independent of the driver's wish, and therefore is automatic, can also take place, for example when the vehicle must be held stationary no longer by the service brake system but by the parking brake system after a given time period has been exceeded.

A pressure sensor 76, which detects the pressure prevailing in the hydraulic chamber 52 or the hydraulic line 58 and communicates said pressure to the control unit 44 via input signals E3, may also be optionally provided. The hydraulic pressure generated in the hydraulic chamber 52 is a value relevant to the regulation/control of the parking brake mode. Additionally—or if the pressure sensor 78 is not present—the hydraulic pressure and the clamping force can be determined using mathematical models—for example, in the case of parking brake mode, on the basis of a current consumption of the electric motors 36 and 68.

As already explained in the introductory section, the parking brake systems of the prior art are conventionally actuated in such a manner that the hydraulic actuator of a parking brake contributes the entire build-up of clamping force on its own. The mechanical actuators are activated only when they are able to follow rapidly behind the brake piston, which is displaced ahead of them by the hydraulically generated pressure, substantially without exerting force thereon. Only at the end of the travel of the brake piston does the actuating member 74 exert a strong force on the brake piston 54 in order to compensate its setting behaviour after the hydraulic pressure has dropped. The hydraulically generated clamping force is then maintained as a result of the self-locking configuration of the nut/spindle arrangement 70, 72, and the electric motor 68 can be switched off.

Figure 3:
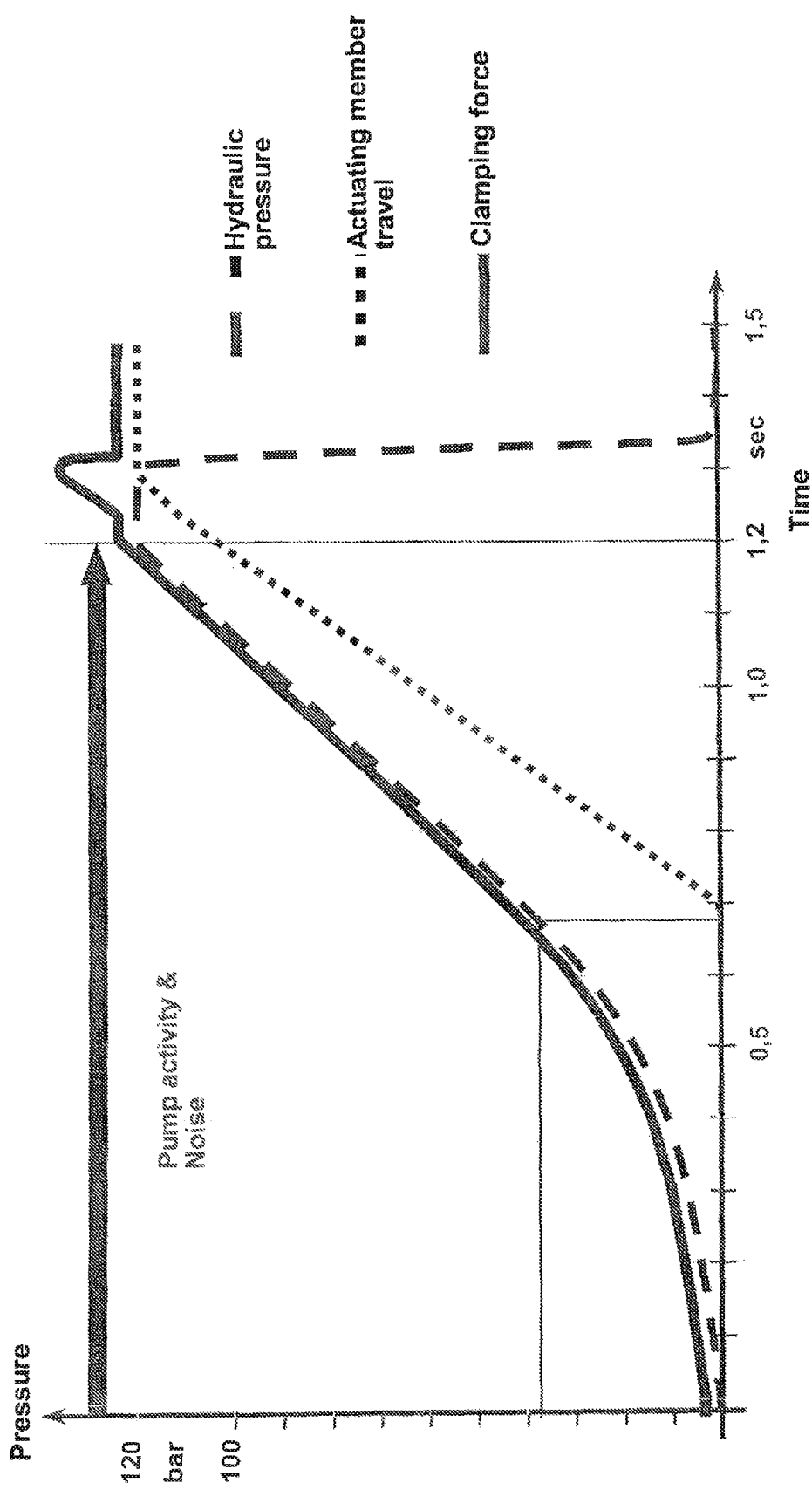
FIG. 3 is a schematic diagram showing the curves of brake pressure, piston travel and clamping force of a conventional hydraulic parking brake.

FIG. 3 illustrates such a conventional parking brake operation in a pressure/time diagram. As is apparent from this diagram, the clamping force generated by means of the friction linings 60, 64 is proportional to the hydraulically generated brake pressure in the hydraulic chamber 52 (in FIG. 3 the clamping force is represented in arbitrary units). Also in arbitrary units, FIG. 3 represents the travel of the actuating member 74. The fact that the actuating member 74 follows rapidly behind the brake piston 54 (and therefore follows behind the build-up of clamping force) can be clearly seen. It can also be seen that the actuating member 74 has covered its maximum travel distance and takes over the maintaining of the clamping force after the hydraulic pressure has dropped. The clamping force spike shortly before the removal of the hydraulically generated brake pressure is explained by the coming into abutment of the actuating member 74 against the brake piston 54.

The diagram in FIG. 3 makes clear that the maximum hydraulic pressure of approximately 120 bar is reached after 1.2 seconds of running time of the hydraulic actuator (that is, of the electric motor 36 and the pump 38 shown in FIG. 1). The noises accompanying the operation of the hydraulic actuator are therefore also clearly perceptible for 1.2 seconds.

It has been found that, with the hydraulic pressure generation sketched in FIG. 3, approximately 55% of the maximum hydraulic fluid receiving volume of the hydraulic chamber 52 has been reached by the time a clamping force corresponding to a hydraulic pressure of approximately 37.5 bar has been built up. (As explained in connection with FIG. 3, an approximately proportional relationship between hydraulic pressure and clamping force can be assumed in this case). This situation is illustrated in the volume/hydraulic pressure diagram according to FIG. 4, and the exemplary value of 37.5 bar has been chosen because the clamping force equivalent to this hydraulic pressure can still just be achieved by means of the mechanical actuator.

Figure 4:
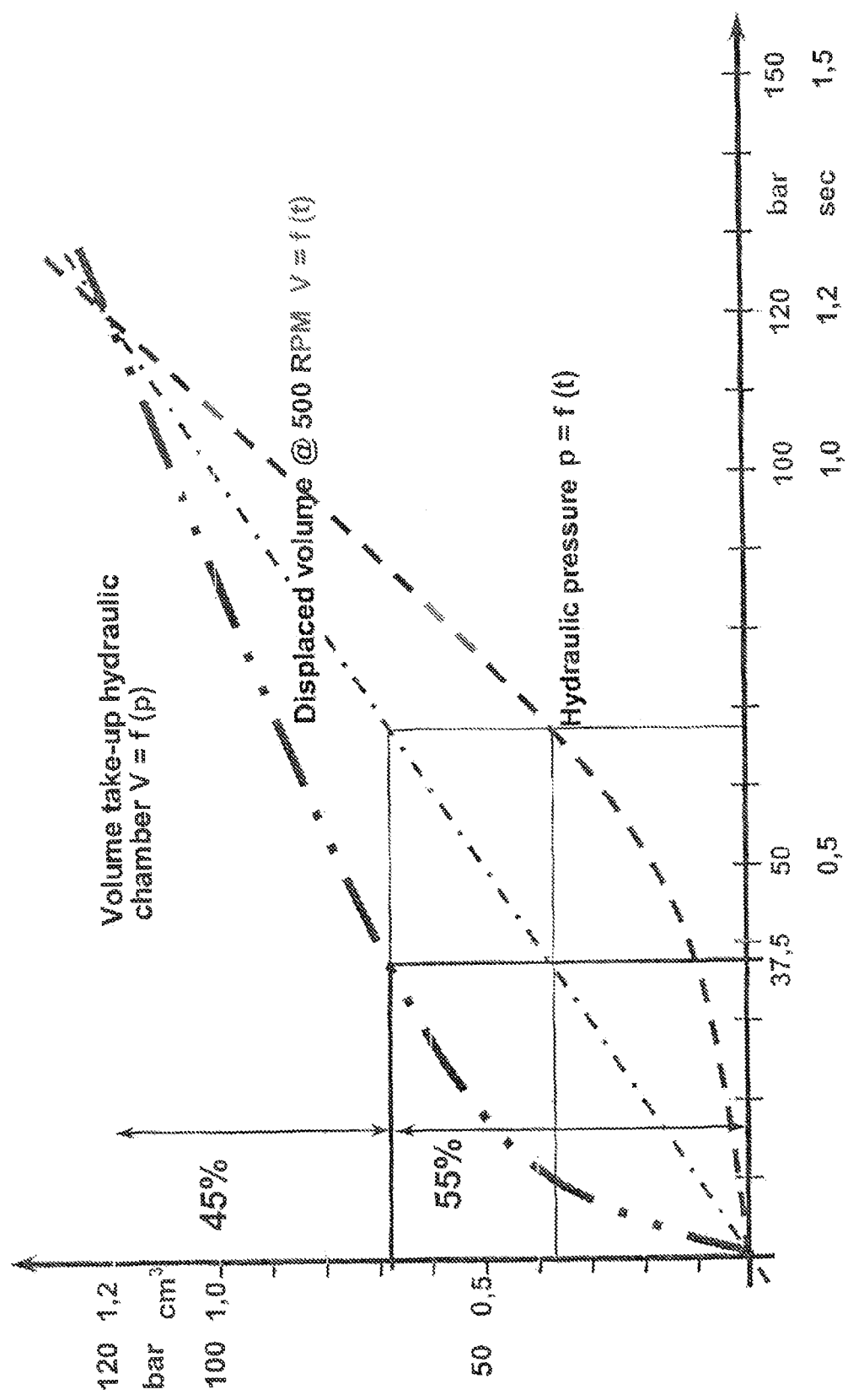
FIG. 4 is a schematic diagram showing the curves of volume take-up, displaced volume and brake pressure.

As also illustrated in FIG. 4, at a constant speed of the electric motor 36 driving the pump 38, 55% of the total time taken to build up the pressure of 120 bar is needed in order to pump 55% of the maximum displaced volume required. On the basis of this observation, a noise-optimised operation of the parking brake system illustrated in FIGS. 1 and 2 is proposed in the present embodiment. The noise-optimised operation is based essentially on the fact that the build-up of the clamping force to an equivalent hydraulic pressure value of approximately 37.5 bar is taken over by the mechanical actuator. In other words, activation of the hydraulic actuator is delayed until a time when a clamping force has been built up by the mechanical actuator which corresponds to an equivalent hydraulic fluid pressure of 37.5 bar. The total running time of the hydraulic actuator, and the associated noise, can therefore be significantly reduced.

In order to implement a parking brake operation which is noise-optimised in this way, the control unit 44 is equipped with three control modules $44_1$, $44_2$, $44_3$, as illustrated in FIG. 2.

The first control module $44_1$ is configured to activate the mechanical actuator in order to displace the brake piston 54 in the hydraulic chamber 52 in such a manner that the friction linings 60, 64 come into abutment against the brake disc 66. In the embodiment, the mechanical actuator is configured in such a manner that the mechanical actuator alone enables a clamping force corresponding to an equivalent hydraulic fluid pressure of 37.5 bar to be built up. As a result of the displacement of the brake piston 54 by means of the mechanical actuator, the volume of the hydraulic fluid contained in the hydraulic chamber 52 is increased. This situation is explained by the fact that, as the piston 54 is displaced by means of the mechanical actuator, a negative pressure is generated in the hydraulic chamber 52, and this negative pressure draws hydraulic fluid into the hydraulic chamber 52 via the hydraulic line 58.

Figure 5:
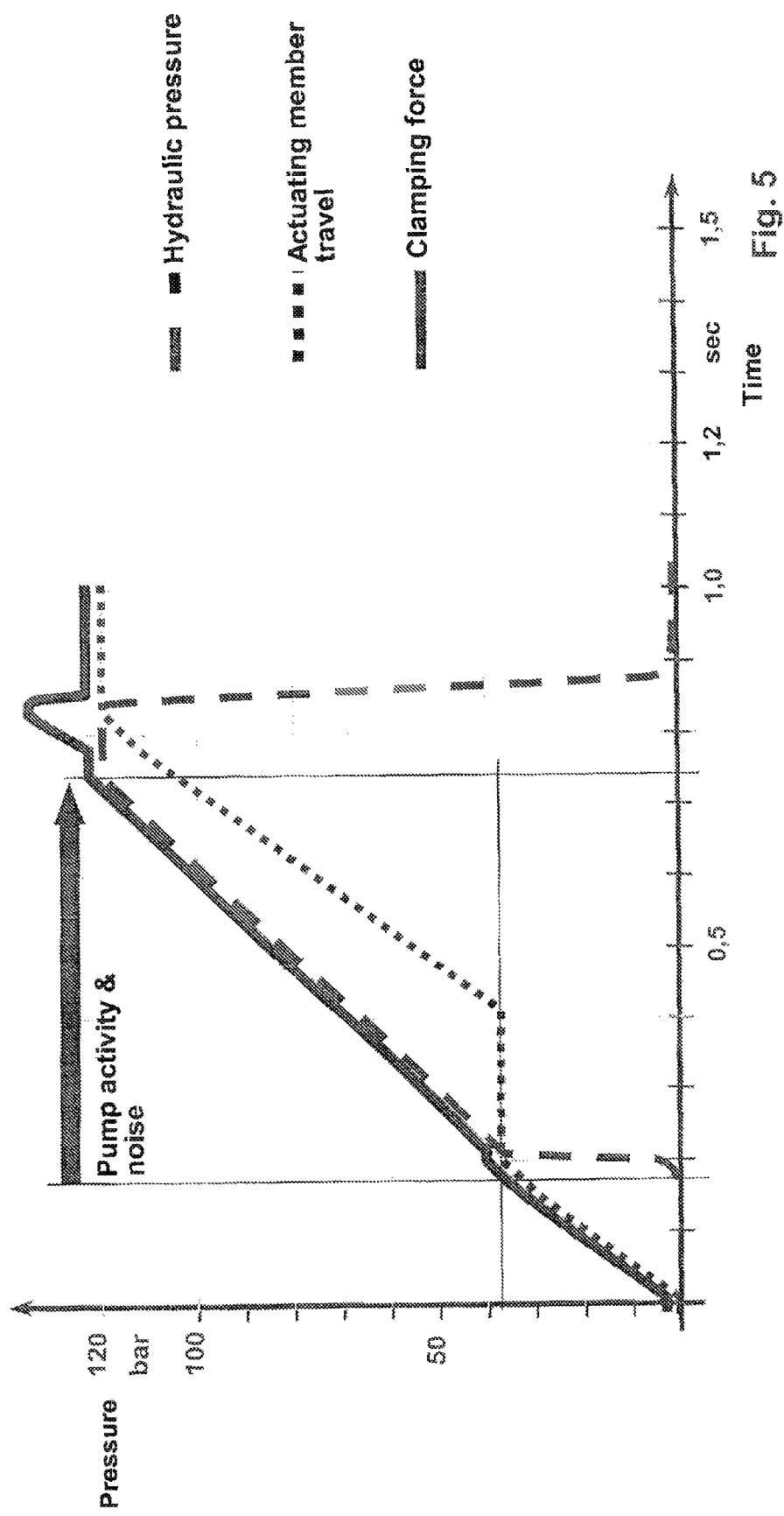
FIG. 5 is a schematic diagram showing the curves of brake pressure, piston travel and clamping force according to an embodiment.

The overall situation is represented graphically in the schematic pressure/time diagram of FIG. 5. The increase in clamping force within an equivalent range from approximately 0 to 37.5 bar, resulting from the displacement of the brake piston 54 by means of the mechanical actuator, can be clearly seen. The hydraulic actuator remains deactivated up to an equivalent hydraulic pressure value of slightly below 37.5 bar.

The second control module $44_2$ of the control unit 44 is configured to activate the hydraulic actuator, once the hydraulic fluid volume within the hydraulic chamber 52 has been increased by means of the mechanical actuator, in order to increase the clamping force of the parking brake further. This situation is also represented in FIG. 5. As soon as a clamping force corresponding to the maximum power capability of the mechanical actuator has been built up by means of the mechanical actuator, after approximately 0.18 seconds the hydraulic actuator is activated and the mechanical actuator is deactivated shortly thereafter. Upon activation of the hydraulic actuator a hydraulic pressure value of 37.5 bar is already established after approximately 0.2 seconds, and the further build-up of clamping force to a value of 120 bar is effected by means of the hydraulic actuator.

The third control module $44_3$ of the control unit 44 is configured to actuate the mechanical actuator in order to maintain the clamping force. For this purpose the mechanical actuator is reactivated after approximately 0.4 seconds. As a result of this reactivation of the mechanical actuator, the actuating member 74 follows rapidly behind the brake piston 54, as indicated by the curve in FIG. 5. Shortly after the maximum hydraulic pressure of 120 bar has been reached, the actuating member 74 again comes into abutment against the brake piston 54 in the usual manner. At this hydraulic pressure value, therefore, the mechanical actuator locks the brake piston 54 and fixes the clamping force generated by the brake piston 54. The hydraulic actuator can then be switched off (resulting in the hydraulic pressure drop shown in FIG. 5). Furthermore, because of the self-locking design of the mechanical actuator, the electric motor 68 associated with the mechanical actuator can also be switched off.

Figure 6:
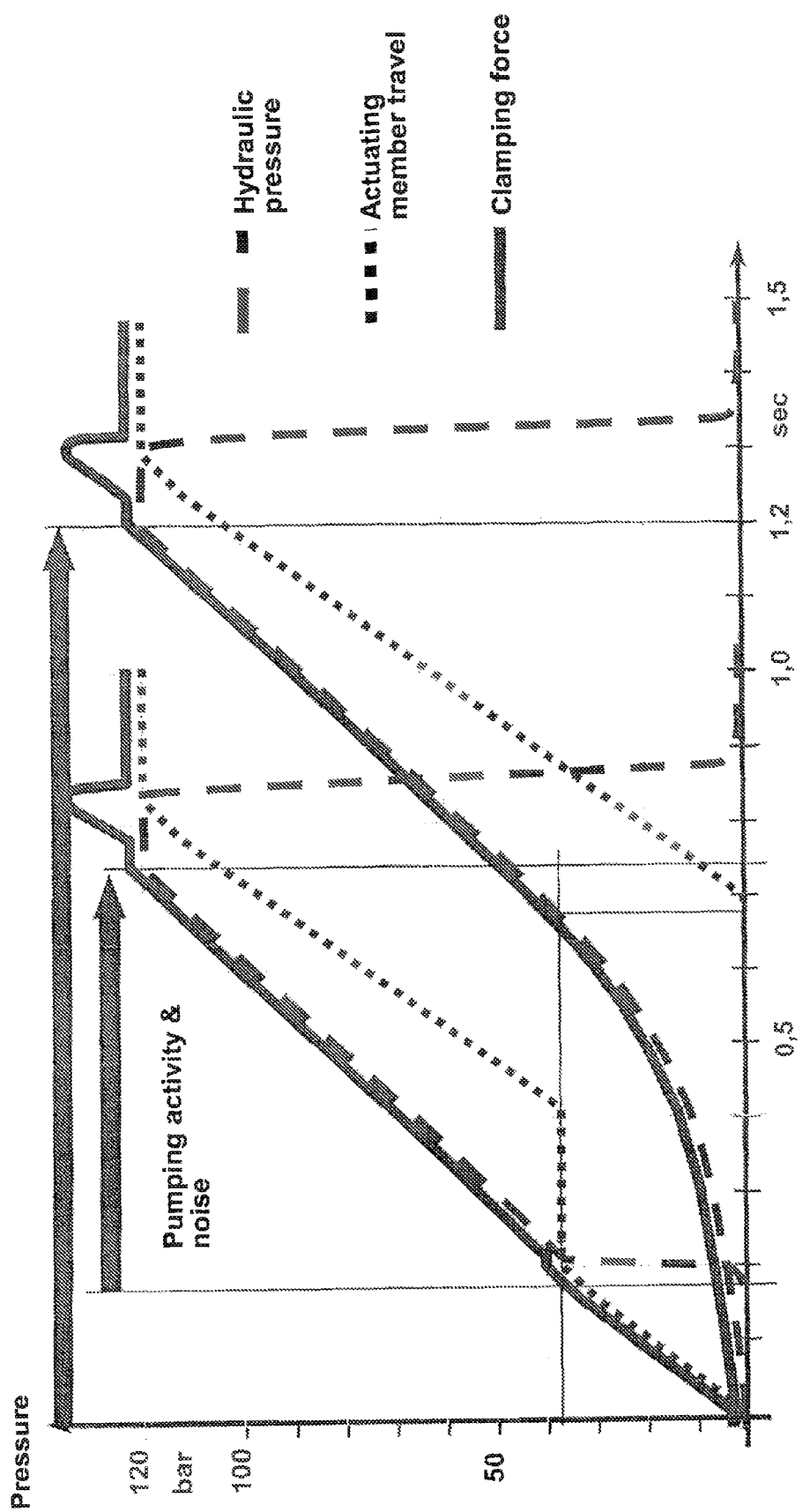
FIG. 6 is a schematic diagram showing a comparison of the curves of brake pressure, piston travel and clamping force in a conventional hydraulic parking brake and according to an embodiment.

As is apparent from FIG. 5, the hydraulic actuator needs to be activated only at approximately a clamping force corresponding to an equivalent hydraulic pressure of 37.5 bar. For this reason the operating time of the hydraulic actuator in the course of a parking brake operation can be significantly reduced. In this connection, FIG. 6 shows a comparative representation of the conventional parking brake operation according to FIG. 3 and of the parking brake operation according to the embodiment sketched in FIG. 5. This comparison reveals not only a shortening of the operating time of the hydraulic actuator of approximately 55%, but in addition a reduction of the total brake application time of approximately 40%. The shorter brake application time is explained by the high stiffness of the brake above approximately 37 bar, which goes together with a comparatively short pressure build-up time.

FIGS. 7 and 8 again show the timing control of the mechanical actuator on one hand and of the hydraulic actuator on the other. More precisely, FIGS. 7 and 8 each show the activation of the electric motor 36 of the hydraulic actuator (designated as the ESC motor in the drawings) and of the electric motor 68 of the mechanical actuator (designated as the HPB motor in the drawings). The diagram of FIG. 7 corresponds to the diagram of FIG. 5.

Figure 7:
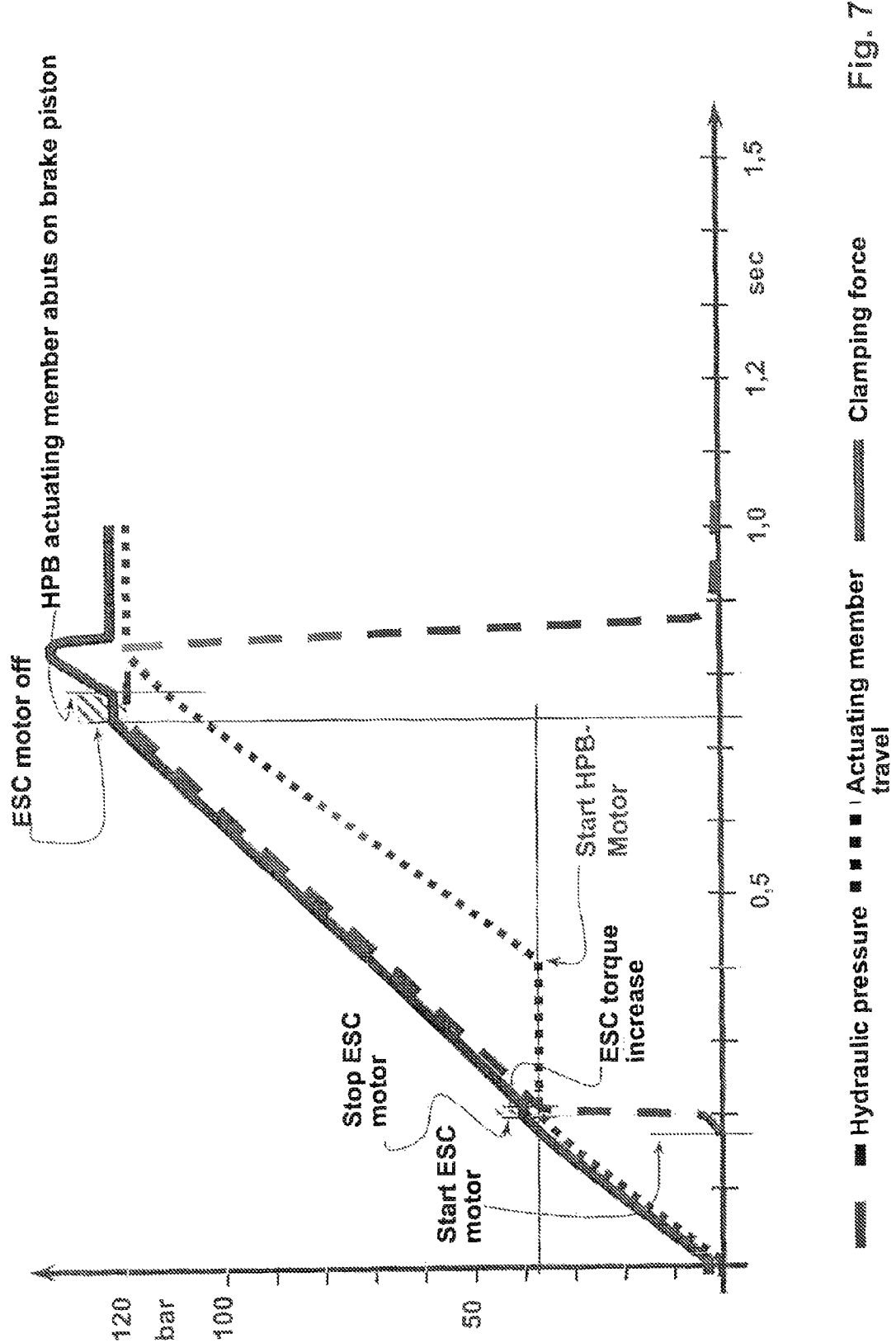
FIG. 7 is a schematic diagram showing the curves of brake pressure, piston travel and clamping force, together with actuator activation, according to an embodiment.

As can be seen in FIG. 7, the parking brake operation begins with the starting of the electric motor 68 of the mechanical actuator (HPB motor) at time 0. Shortly before the maximum clamping force attainable with the mechanical actuator (corresponding to an equivalent hydraulic fluid pressure of 37.5 bar) is reached, the electric motor 36 of the hydraulic actuator (ESC motor) is started after approximately 0.18 seconds.

At a time of approximately 0.2 seconds, that is, comparatively quickly, a hydraulic fluid pressure of approximately 37.5 bar has been generated by the hydraulic actuator, and the further increase in clamping force can therefore be effected by hydraulic means. For this reason, the electric motor 68 of the mechanical actuator is briefly switched off. After approximately 0.4 seconds the electric motor 68 of the mechanical actuator is reactivated, and the actuating member 74 follows rapidly behind the hydraulically actuated brake piston 54, substantially without exerting force thereon. Then, after approximately 0.74 seconds, the maximum hydraulic pressure of 120 bar, and therefore also the maximum desired brake application force, has been reached by means of the hydraulic actuator. The electric motor 36 of the hydraulic actuator can be switched off at this time, since the actuating member 74 comes into abutment against the brake piston 54 shortly thereafter, namely after approximately 0.76 seconds, locking the brake piston 54, so that the clamping force generated hydraulically is maintained mechanically.

Figure 8:
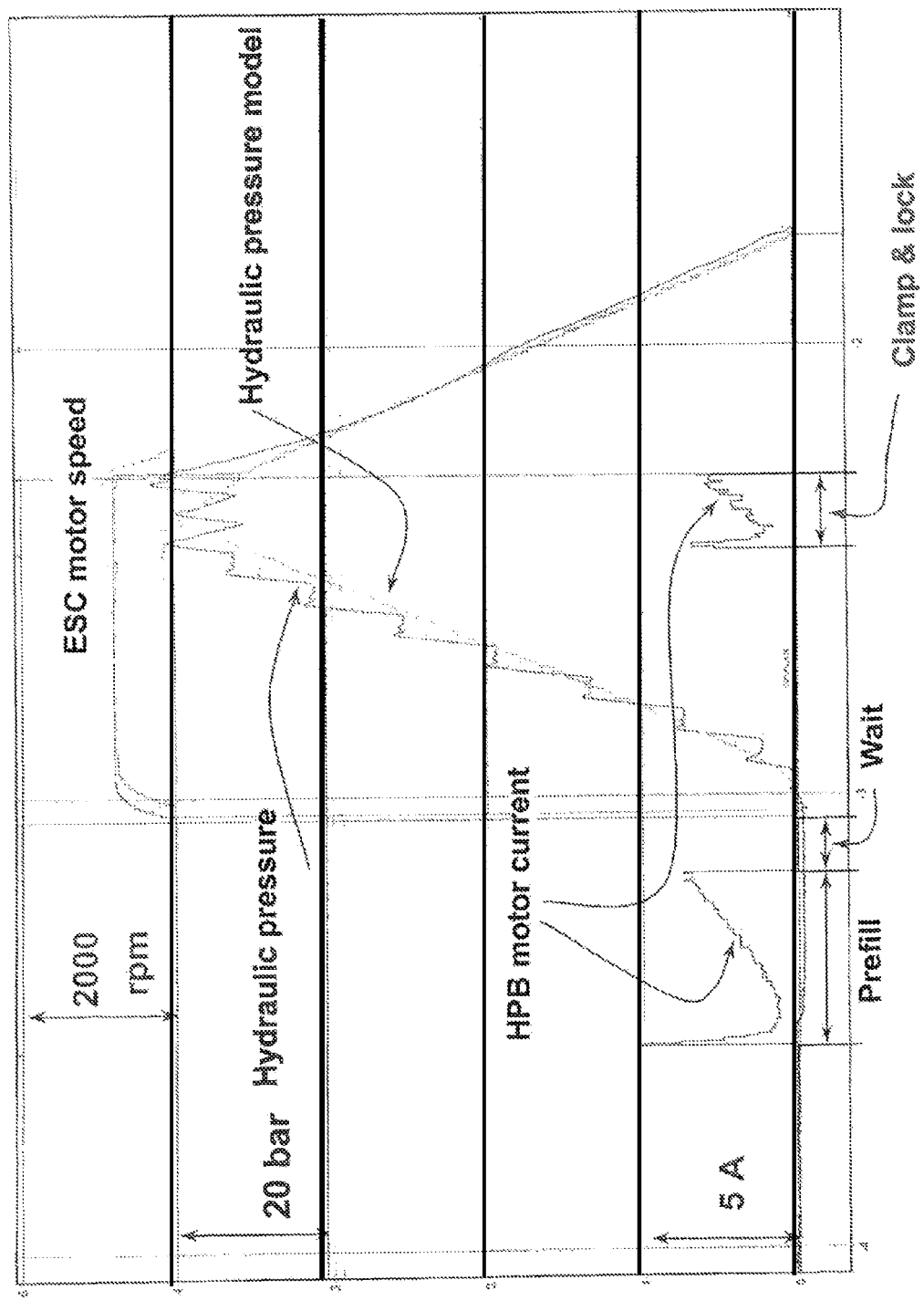
FIG. 8 is a detailed representation of the actuator activation according to FIG. 7.

It should be noted in this connection that too much time must not elapse between the switching off of the electric motor 36 of the hydraulic actuator and the coming into abutment of the actuating member 74 against the brake piston 54 (which, as shown in FIG. 8, is manifested in a rise in the current consumption of the electric motor 68 of the mechanical actuator). For this purpose, the starting value of the electric motor 68 can be set, for example, adaptively. In other words, if it is detected during an actuation of the parking brake that the time interval between the switching off of the electric motor 36 and the coming into abutment of the actuating member 74 is too long, the electric motor 68 of the mechanical actuator is started somewhat earlier in the next parking brake operation, and vice versa. The corresponding time-related or pressure-related starting values may be stored in an EEPROM. To keep the load on the mechanical actuator as low as possible, the rise in the current consumption of the electric motor 68 associated with the coming into abutment of the actuating member 74 against the brake piston 54 is to be avoided, or at any rate limited to a small rise.

Care should also be taken that the motor 36 of the hydraulic actuator is started at the correct time. As already explained, the electric motor 36 should ideally be started shortly before a clamping force corresponding to an equivalent hydraulic fluid pressure of approximately 37.5 bar has been attained by means of the mechanical actuator. In order to determine the correct time, an equalisation of the clamping force attainable by means of the mechanical actuator on the one hand, and of the torque of the electric motor 36 of the hydraulic actuator on the other, is necessary. Such an equalisation may be effected, for example, in that the electric motor 36 is started only when a minimum value of a current consumption of the electric motor 68 of the mechanical actuator is detected (cf. FIG. 8).

For the person skilled in the art it is clear that the operation of a parking brake explained in connection with the embodiment is not restricted to holding a vehicle at standstill. Rather, the operation can be also implemented, for example, in an auto-hold or hill-hold mode.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for actuating a parking brake of a disk brake which comprises a caliper configured for straddling a brake rotor and housing a brake piston in a hydraulic chamber, which brake piston is displaceable within the hydraulic chamber by means of a hydraulic actuator on the one hand and a mechanical actuator on the other, and wherein the brake piston is displaceable for actuation of both the parking brake and a service brake, the method comprising the steps:

activating the mechanical actuator for displacing the brake piston in the hydraulic chamber in such a way that a volume of a hydraulic fluid contained in the hydraulic chamber is increased;

activating the hydraulic actuator, once the hydraulic fluid volume in the hydraulic chamber has been increased by means of the mechanical actuator, for building up or increasing a clamping force of the parking brake; and actuating of the mechanical actuator for maintaining the clamping force.

2. The method according to claim 1, wherein
   the mechanical actuator remains activated until friction linings have been moved into abutment against a brake disc by the brake piston.

3. The method according to claim 1, wherein
   in the course of displacement of the piston a negative pressure is generated in the hydraulic chamber which draws hydraulic fluid into the hydraulic chamber.

4. The method according to claim 1, further including the steps:
   continuously determining of a clamping force of the parking brake which is building up in the course of activation of the mechanical actuator; and
   performing the step of activating the hydraulic actuator as a function of the clamping force determined.

5. The method according to claim 4, wherein
   the continuous determination of the clamping force comprises an estimation of the clamping force on the basis of a current consumption of an electric motor associated with the mechanical actuator or on the basis of an estimated or measured advance of the brake piston.

6. The method according to claim 1, wherein
   activation of the hydraulic actuator takes place when a volume of the hydraulic chamber has increased as a result of the activated mechanical actuator until approximately 35% to 75% of the maximum hydraulic fluid receiving capacity of the hydraulic chamber has been reached.

7. The method according to claim 1, wherein
   the mechanical actuator is at least temporarily deactivated during the build-up or increase of the clamping force by means of the hydraulic actuator.

8. The method according to claim 1, further including the steps:
   continuously determining of a clamping force of the parking brake which is building up in the course of activation of the hydraulic actuator; and
   deactivating the hydraulic actuator as a function of the clamping force determined.

9. The method according to claim 8, wherein
   the continuous determination of the clamping force comprises an estimation of the clamping force on the basis of a current consumption of an electric motor associated with the hydraulic actuator or on the basis of an estimated or measured hydraulic fluid pressure.

10. A computer program product with program code means for carrying out the method according to claim 1 when the computer program product is running on a computer-controlled processing unit wherein the computer program product is stored on a non-transitory computer-readable recording carrier.

11. A parking brake of a disk brake, wherein the disk brake includes a caliper configured for straddling a brake rotor and housing a brake piston received in a hydraulic chamber, which brake piston is displaceable in the hydraulic chamber by means of a hydraulic actuator on the one hand and a mechanical actuator on the other, comprising:
- a first control module which is configured to activate the mechanical actuator to displace the brake piston in the hydraulic chamber in such a way that a volume of a hydraulic fluid contained in the hydraulic chamber is increased;
- a second control module which is configured to activate the hydraulic actuator, once the hydraulic fluid volume in the hydraulic chamber has been increased by means of the mechanical actuator, in order to build up or increase a clamping force of the parking brake; and
- a third control module which is configured to actuate the mechanical actuator to maintain the clamping force.

wherein the brake piston is displaceable for actuation of both the parking brake and a service brake.

12. The parking brake according to claim 11, wherein the hydraulic actuator comprises at least an electric-motor actuatable hydraulic pump.

13. The parking brake according to claim 11, wherein the mechanical actuator comprises an electric-motor actuatable nut/spindle arrangement cooperating with the brake piston.

14. The parking brake according to claim 11, further comprising a device for continuously determining the clamping force, the actuators being activatable as a function of the clamping force determined.

15. The parking brake according to claim 14, wherein the device for continuously determining the clamping force comprises a hydraulic pressure sensor or a sensor for detecting a current consumption of at least one actuator component.

* * * * *